US008482555B2

(12) United States Patent
Jeon et al.

(10) Patent No.: US 8,482,555 B2
(45) Date of Patent: Jul. 9, 2013

(54) ORGANIC LIGHT EMITTING DIODE DISPLAY

(75) Inventors: Changhoon Jeon, Kyungbuk (KR); Keunchoul Kim, Seoul (KR)

(73) Assignee: LG Display, Co., Ltd., Seoul (KR)

( * ) Notice: Subject to any disclaimer, the term of this patent is extended or adjusted under 35 U.S.C. 154(b) by 1007 days.

(21) Appl. No.: 12/461,300

(22) Filed: Aug. 6, 2009

(65) Prior Publication Data

US 2010/0103160 A1 Apr. 29, 2010

(30) Foreign Application Priority Data

Oct. 28, 2008 (KR) ........................ 10-2008-0106155

(51) Int. Cl.
*G06F 3/038* (2006.01)
*G09G 5/00* (2006.01)
*G09G 3/30* (2006.01)
*G09G 3/32* (2006.01)

(52) U.S. Cl.
USPC ................................ 345/213; 345/76; 345/82

(58) Field of Classification Search
USPC .......................................................... 345/213
See application file for complete search history.

(56) References Cited

U.S. PATENT DOCUMENTS

2009/0051630 A1* 2/2009 Osame et al. .................. 345/82
2009/0109142 A1* 4/2009 Takahara ........................ 345/76

* cited by examiner

*Primary Examiner* — Charles V Hicks
(74) *Attorney, Agent, or Firm* — McKenna, Long & Aldridge, LLP

(57) ABSTRACT

An organic light emitting diode (OLED) display is provided. The OLED display includes a display panel including pixels formed at each of crossings of a plurality of gate lines and a plurality of data lines, a monitoring signal line formed along an outer area of the display panel, a first signal supply unit that supplies a monitoring signal to the monitoring signal line and generates a first power control signal, a power supply unit that supplies a high potential driving voltage and a low potential driving voltage to the pixels, and a second signal supply unit that monitors the monitoring signal and generates a second power control signal. If the monitoring signal is not monitored, the second signal supply unit controls the power supply unit through the second power control signal and allows the power supply unit to stop supplying one of the high and low potential driving voltages to the pixels.

8 Claims, 6 Drawing Sheets

ORGANIC LIGHT EMITTING DIODE DISPLAY

This application claims the benefit of Korea Patent Application No. 10-2008-106155 filed on Oct. 28, 2008, the entire contents of which is incorporated herein by reference for all purposes as if fully set forth herein.

BACKGROUND OF THE INVENTION

1. Field of the Invention

Embodiments of the invention relate to an organic light emitting diode (OLED) display capable of preventing a local light emission due to a damage of a display panel.

2. Discussion of the Related Art

Various flat panel displays whose weight and size are smaller than cathode ray tubes have been recently developed. Examples of the flat panel displays include a liquid crystal display (LCD), a field emission display (FED), a plasma display panel (PDP), and an electroluminescence device.

Because the PDP has a simple structure and is manufactured through a simple process, the PDP has been considered as a display device having characteristics such as lightness in weight and thin profile and providing the large-sized screen. However, the PDP has disadvantages such as low light emitting efficiency, low luminance, and high power consumption. A thin film transistor (TFT) LCD using a TFT as a switching element is the most widely used flat panel display. However, because the TFT LCD is not a self-emission display, the TFT LCD has a narrow viewing angle and a low response speed. The electroluminescence device is classified into an inorganic light emitting diode display and an organic light emitting diode (OLED) display depending on a material of an emitting layer. Because the OLED display is a self-emission display, the OLED display has characteristics such as a fast response speed, a high light emitting efficiency, a high luminance, and a wide viewing angle.

The OLED display, as shown in FIG. 1, includes an organic light emitting diode. The organic light emitting diode includes organic compound layers between an anode electrode and a cathode electrode. The organic compound layers include a hole injection layer HIL, a hole transport layer HTL, an emitting layer EML, an electron transport layer ETL, and an electron injection layer EIL.

When a driving voltage is applied to the anode electrode and the cathode electrode, holes passing through the hole transport layer HTL and electrons passing through the electron transport layer ETL move to the emitting layer EML and form an exciton. Hence, the emitting layer EML generates visible light.

In the OLED display, pixels each including the above-described organic light emitting diode are arranged in a matrix format, and a brightness of the pixels selected by a scan pulse is controlled depending on a gray level of video data. In the OLED display, the pixel is selected by selectively turning on a TFT used as an active element and remains in a light emitting state due to a voltage charged to a storage capacitor.

In the OLED display, a power integrated circuit (IC) generates the driving voltage (for example, a high potential driving voltage and a low potential driving voltage) applied to the pixels and is controlled by a power control signal received from a driver IC. Even if a display panel of the OLED display is damaged, the OLED display may partially emit light because of a normal operation of the driver IC. In other words, if the driver IC normally operates in a state of the damage of the display panel, the power IC applies the driving voltage to the pixels in response to the power control signal from the driver IC. Hence, a non-damage portion of the display panel locally emits light. As described above, if only the non-damage portion of the display panel continuously emits light in an abnormal driving state such as the damage of the display panel, it is more likely to cause security problems because of local burning.

However, because the related art OLED display dose not have an element that monitors defects such as the damage of the display panel and prevents the local light emission in the abnormal driving state, it is difficult to previously prevent the security problems.

SUMMARY OF THE INVENTION

Embodiments of the invention provide an organic light emitting diode (OLED) display capable of monitoring defects such as a damage of a display panel and preventing a local light emission of the display panel in an abnormal driving state.

In one aspect, there is an OLED display comprising a display panel including pixels formed at each of crossings of a plurality of gate lines and a plurality of data lines, a monitoring signal line formed along an outer area of the display panel on which an image is not displayed, a first signal supply unit that supplies a monitoring signal to the monitoring signal line and generates a first power control signal, a power supply unit that supplies a high potential driving voltage and a low potential driving voltage to the pixels in response to the first power control signal, and a second signal supply unit that monitors the monitoring signal and generates a second power control signal based on a monitoring result, wherein if the monitoring signal is not monitored in a state where the high and low potential driving voltages are supplied to the pixels, the second signal supply unit controls the power supply unit using the second power control signal and allows the power supply unit to stop supplying one of the high and low potential driving voltages to the pixels.

The OLED display further includes a source driver driving the data lines, a scan driver driving the gate lines, a timing controller controlling operation timing of the source driver and operation timing of the scan driver, and a system that supplies digital video data and a timing signal to the timing controller.

The first and second signal supply units are built in the timing controller.

The monitoring signal is a signal requiring data of one frame to be displayed on the display panel. The monitoring signal is generated by the timing controller and then is supplied to the system through the monitoring signal line.

In another aspect, there is an OLED display comprising a display panel including pixels formed at each of crossings of a plurality of gate lines and a plurality of data lines, a monitoring signal line formed along an outer area of the display panel on which an image is not displayed, a signal supply unit that supplies a monitoring signal to the monitoring signal line and generates a power control signal, a power supply unit that supplies a high potential driving voltage and a low potential driving voltage to the pixels in response to the power control signal, and a data adjusting unit that monitors the monitoring signal and adjusts a level of digital video data to be displayed on the display panel based on a monitoring result, wherein if the monitoring signal is not monitored in a state where the high and low potential driving voltages are supplied to the pixels, the data adjusting unit adjusts the level of the digital video data at a level capable of turning off a driving thin film transistor (TFT) of each of the pixels.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail embodiments of the invention examples of which are illustrated in the accompanying drawings.

First Exemplary Embodiment

Figure 1:
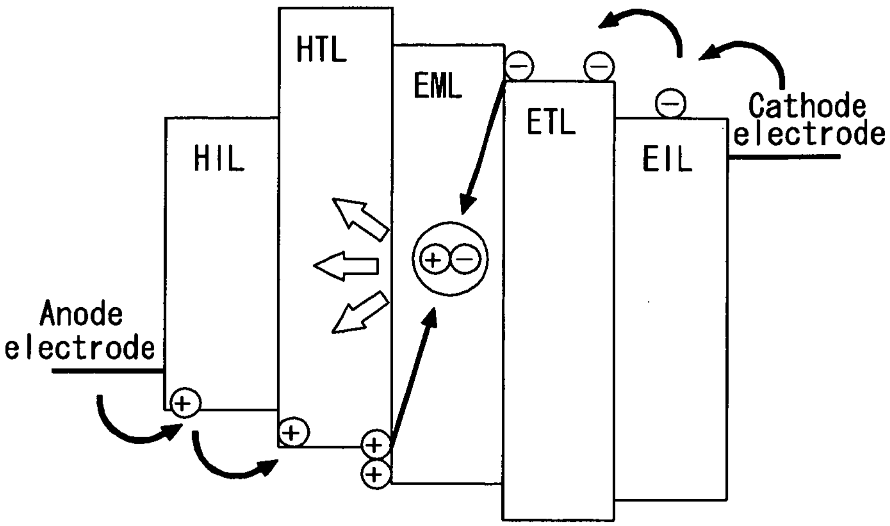
FIG. 1 (Related Art)
FIG. 1 is a diagram illustrating a light emitting principle of a general organic light emitting diode (OLED) display.
Figure 2:
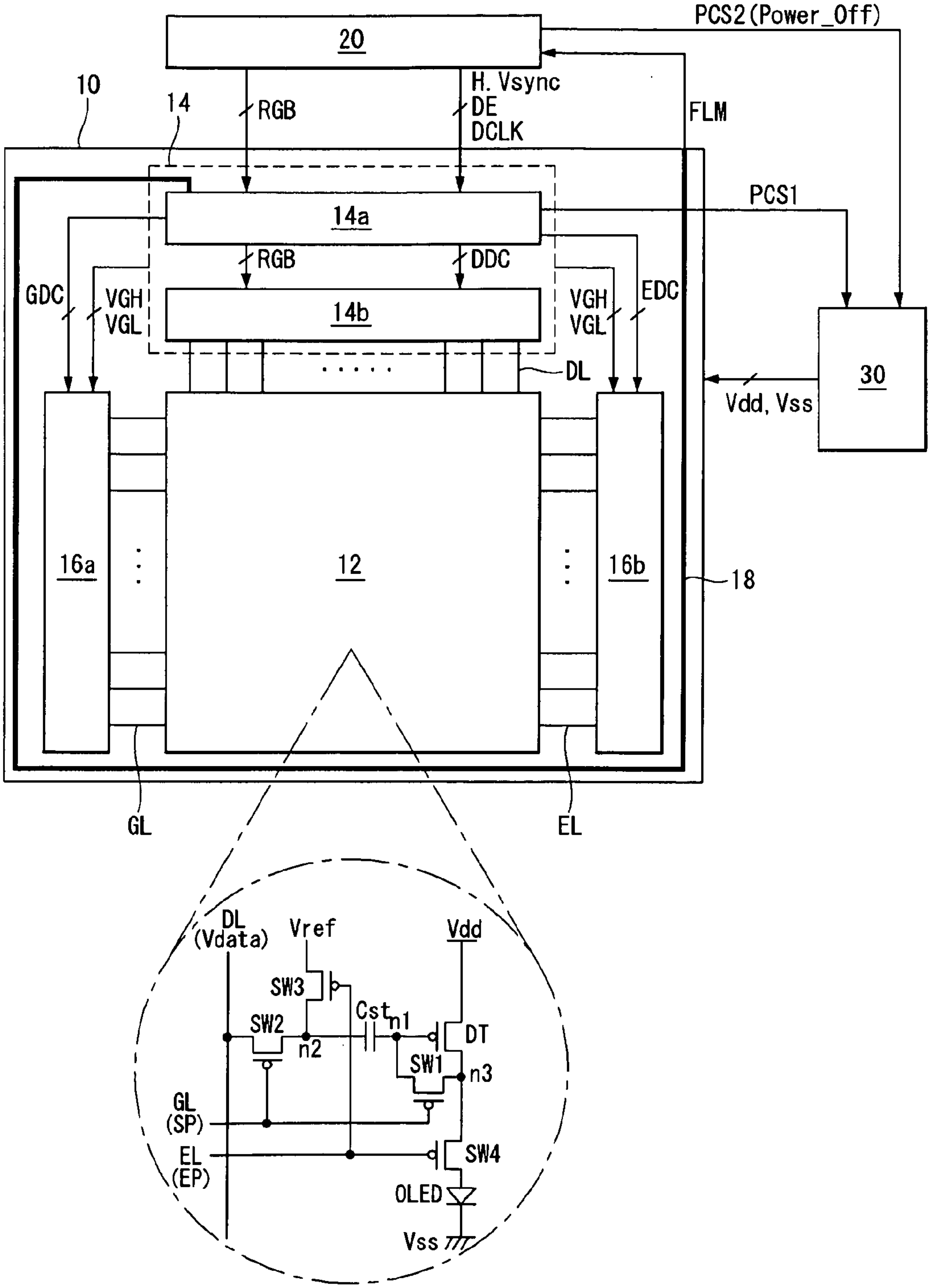
FIG. 2 is a block view of an OLED display according to a first exemplary embodiment of the invention.

FIG. 2 is a block view of an organic light emitting diode (OLED) display according to a first exemplary embodiment of the invention.

As shown in FIG. 2, the OLED display according to the first exemplary embodiment of the invention includes a display panel 10, a system 20, and a power integrated circuit (IC) 30. A driver IC 14 is mounted in a non-display area of the display panel 10 using a chip-on-glass (COG) technology, and a scan driver 16*a* and an emission driver 16*b* are formed in the non-display area of the display panel 10 using a gate-in-panel (GIP) technology.

A plurality of data lines DL, a plurality of gate lines GL, and a plurality of emission lines EL cross one another in an effective display area of the display panel 10, and a pixel 12 is formed at each of crossings of the lines DL, GL, and EL in a matrix format. Each of the pixels 12 includes an organic light emitting diode, a driving thin film transistor (TFT), a plurality of switching TFTs, and a storage capacitor.

For example, as shown in FIG. 2, each of the pixels 12 includes an organic light emitting diode OLED, a driving TFT DT, first to fourth switching TFTs SW1 to SW4, and a storage capacitor Cst. The organic light emitting diode OLED has one terminal receiving a high potential driving voltage Vdd and another terminal receiving a low potential driving voltage Vss and emits light by a current flowing between the two terminals. The driving TFT DT controls an amount of current flowing in the organic light emitting diode OLED depending on a voltage difference between a gate and a source of the driving TFT DT. The first switching TFT SW1 is connected between a first node n1 and a third node n3 and diode-connects the driving TFT DT to sense a threshold voltage of the driving TFT DT. The second switching TFT SW2 switches a current path between the data line DL and a second node n2. The third switching TFT SW3 switches a current path between a reference voltage source Vref and the second node n2. The fourth switching TFT SW4 switches a current path between the third node n3 and the organic light emitting diode OLED. The storage capacitor Cst is connected between the first node n1 and the second node n2. The driving TFT DT and the first to fourth switching TFTs SW1 to SW4 may use a p-type metal-oxide semiconductor field effect transistor (MOSFET). A semiconductor layer of the driving TFT DT includes a polysilicon layer.

Figure 3:
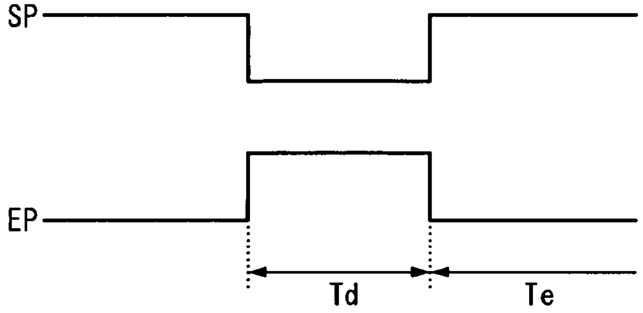
FIG. 3 is a timing diagram of a scan pulse and an emission pulse applied to a pixel.

An exemplary operation of the pixel 12 is described with reference to FIG. 3. During a data write period Td, a scan pulse SP of a low logic level is generated, and thus the first and second switching TFTs SW1 and SW2 are turned on. Further, an emission pulse EP of a high logic level is generated, and thus the third and fourth switching TFTs SW3 and SW4 are turned off. Hence, a voltage of the first node n1 is kept at a first voltage level obtained by subtracting the threshold voltage of the driving TFT DT from the high potential driving voltage Vdd, and a voltage of the second node n2 is kept at a data voltage Vdata. Subsequently, during an emission period Te, the scan pulse SP of a high logic level is generated, and thus the first and second switching TFTs SW1 and SW2 are turned off. Further, the emission pulse EP of a low logic level is generated, and thus the third and fourth switching TFTs SW3 and SW4 are turned on. Hence, the voltage of the second node n2 is lowered from the data voltage Vdata to a reference voltage level, and the voltage of the first node n1 is lowered from the first voltage level to a second voltage level because of a capacitor coupling. Because the second voltage level includes a change amount of the threshold voltage of the driving TFT DT, the driving TFT DT applies a driving current to the organic light emitting diode OLED irrespective of the change amount of the threshold voltage and allows the organic light emitting diode OLED to emit light. Since the exemplary operation and the exemplary structure of the pixel 12 are described in the embodiment, other operations and structures may be used for the pixel 12.

Figure 4:
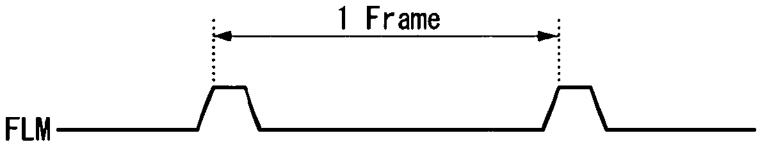
FIG. 4 is a timing diagram of an FLM signal applied to a monitoring signal line.

A monitoring signal line 18 is formed in the non-display area of the display panel 10. The monitoring signal line 18 is formed along an outer area of the display panel 10 excluding a formation area of the driver IC 14 and is shaped like "⊏". The monitoring signal line 18 supplies a frame line mark (FLM) signal received from a timing controller 14*a* to the system 20. The FLM signal is a signal requiring digital video data to be displayed during 1 frame and is generated every 1 frame as shown in FIG. 4.

The driver IC 14 is mounted on the display panel 10 using the COG technology. The driver IC 14 includes a source driver 14*b* for driving the data lines DL and the timing controller 14*a* for controlling operation timing of the drivers 14*b*, 16*a*, and 16*b* and is integrated. The driver IC 14 may further include a level shifter (not shown) that generates a gate high voltage VGH and a gate low voltage VGL and supplies the gate high and low voltages VGH and VGL to the scan driver 16*a* and the emission driver 16*b*. The gate high and low voltages VGH and VGL have a voltage level suitable for a drive of the TFTs of the pixel 12.

The timing controller 14*a* generates a control signal DDC for controlling operation timing of the source driver 14*b*, a control signal GDC for controlling operation timing of the scan driver 16*a*, and a control signal EDC for controlling operation timing of the emission driver 16*b* based on timing signals, such as horizontal and vertical sync signals Hsync and Vsync, a data enable signal DE, and a dot clock signal DCLK. The control signal DDC for controlling the operation timing of the source driver 14*b* includes a source sampling clock signal SSC indicating a latch operation of data inside the source driver 14*b* based on a rising or falling edge, a source output enable signal SOE indicating an output of the source driver 14*b*, and the like. The control signal GDC for controlling the operation timing of the scan driver 16*a* includes a gate start pulse GSP, a gate shift clock signal GSC, a gate output enable signal GOE, and the like. The gate start pulse GSP indicates a scan start horizontal line in 1 vertical period when one screen is displayed. The gate shift clock signal GSC is input to a shift resistor of the scan driver 16*a* and has a pulse width corresponding to a turned-on period of the TFT so that the gate start pulse GSP sequentially shifts. The gate output enable signal GOE indicates an output of the scan driver 16*a*. The control signal EDC for controlling the operation timing of the emission driver 16*b* includes an emission start pulse ESP, an emission shift clock signal ESC, an emission output enable signal ESP, and the like. The timing controller 14*a* converts digital video data RGB received from the system 20 in conformity with a resolution of the display panel 10 and then supplies the converted digital video data RGB to the source driver 14*b*. If digital video data corresponding to 1 frame is displayed on the display panel 10 via the source driver 14*b*, the timing controller 14*a* supplies the FLM signal to the system 20 through the monitoring signal line 18 and then receives digital video data corresponding to next 1 frame from the system 20. The timing controller 14*a* generates a first power control signal PCS1 and controls an output of the power IC 30 through the first power control signal PCS1. More specifically, if a user does not use the OLED display during a predetermined period of time, the timing controller 14*a* generates the first power control signal PCS1 of a first logic level and allows the power IC 30 to stop supplying the high and low driving voltages Vdd and Vss to the pixels 12 of the display panel 10. Hence, the display panel 10 is driven in a power save mode. If the user uses the OLED display within a predetermined period of time, the timing controller 14*a* generates the first power control signal PCS1 of a second logic level and allows the power IC 30 to continuously supply the high and low driving voltages Vdd and Vss to the pixels 12 of the display panel 10. Hence, the display panel 10 is driven in a normal mode.

The source driver 14*b* converts the digital video data RGB into the data voltage Vdata in synchronization with the control signal DDC generated by the timing controller 14*a* and then supplies the data voltage Vdata to the data lines DL.

The scan driver 16*a* consists of a shift resistor array formed on the non-display area of the display panel 10 by the gate in panel (GIP) technology using the same process as the TFTs of the pixel 12. The scan driver 16*a* sequentially shifts the gate high voltage VGH and the gate low voltage VGL generated by the level shifter in synchronization with the control signal GDC generated by the timing controller 14*a* and generates the scan pulses SP. The scan driver 16*a* sequentially supplies the scan pulses SP to the gate lines GL and selects horizontal lines to which the data voltage Vdata is supplied.

The emission driver 16*b* consists of a shift resistor array formed on the non-display area of the display panel 10 by the GIP technology using the same process as the TFTs of the pixel 12. The emission driver 16*b* sequentially shifts the gate high voltage VGH and the gate low voltage VGL generated by the level shifter in synchronization with the control signal EDC generated by the timing controller 14*a* and generates the emission pulse EP. The emission driver 16*b* sequentially supplies the emission pulses EP to the emission lines EL and selects horizontal lines to which the emission pulses EP are supplied.

Figure 5:
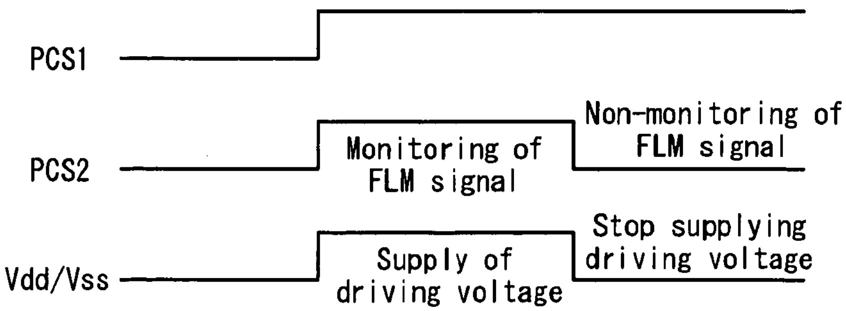
FIG. 5 is a timing diagram showing supply or non-supply of a driving voltage depending on a second power control signal.

The system 20 supplies the digital video data RGB and the timing signals Hsync, Vsync, DE, and DCLK to the timing controller 14*a*. The system 20 continuously monitors the FLM signal from the monitoring signal line 18 and generates a second power control signal PCS2 with different logic levels based on a monitoring result. More specifically, as shown in FIG. 5, if the FLM signal is monitored, the second power control signal PCS2 of a first logic level is generated. If the FLM signal is not monitored, the second power control signal PCS2 of a second logic level is generated. The fact that the FLM signal is not monitored means a generation of defects such as a damage of the display panel.

The power IC 30 generates the high potential driving voltage Vdd and the low potential driving voltage Vss suitable for a drive of the pixel 12 using an operation power source received from the outside. The power IC 30 includes a DC-DC converter that converts a DC input voltage of a low level into a DC output voltage of a high level. The power IC 30 stops supplying the high and low potential driving voltages Vdd and Vss to the pixels 12 in the power save mode, but continuously supplies the high and low potential driving voltages Vdd and Vss to the pixels 12 in the normal mode. Even if the display panel 10 operates in the normal mode, a supply of one of the high and low potential driving voltages Vdd and Vss to the pixels 12 stops depending on the logic level of the second power control signal PCS2. More specifically, as shown in FIG. 5, the second power control signal PCS2 of the second logic level indicating an abnormal state such as the damage of the display panel 10 is input in the normal mode in which the high and low potential driving voltages Vdd and Vss are normally supplied, the power IC 30 stops supplying one of the high and low potential driving voltages Vdd and Vss to the pixels 12. Hence, a local light emission of the display panel 10 in the abnormal state is prevented.

Second Exemplary Embodiment

Figure 6:
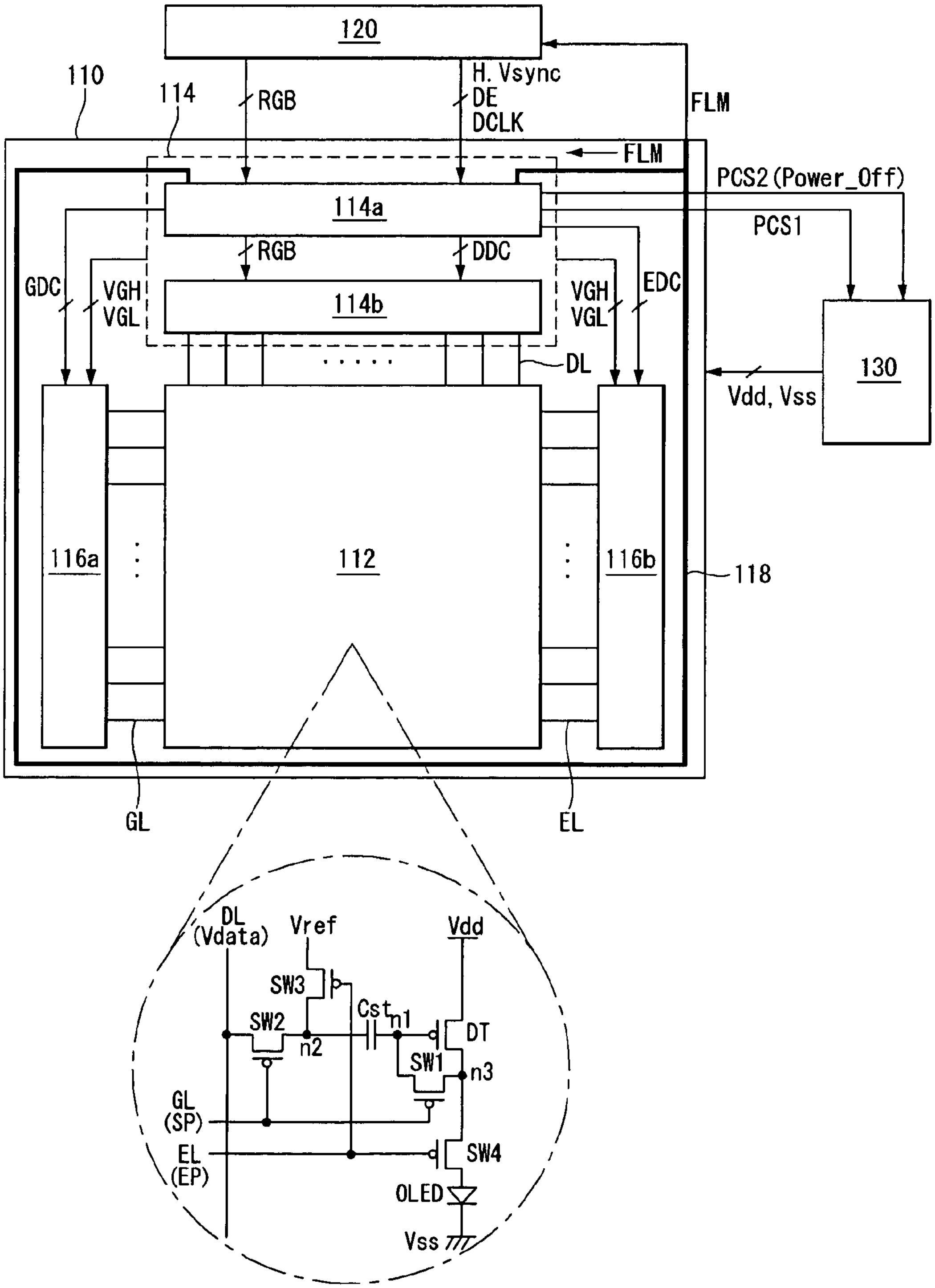
FIG. 6 is a block view of an OLED display according to a second exemplary embodiment of the invention.

FIG. 6 is a block view of an OLED display according to a second exemplary embodiment of the invention.

As shown in FIG. 6, the OLED display according to the second exemplary embodiment of the invention includes a display panel 110, a system 120, and a power IC 130. A driver IC 114 is mounted in a non-display area of the display panel 110 using a COG technology, and a scan driver 116*a* and an emission driver 116*b* are formed in the non-display area of the display panel 110 using a GIP technology.

In the OLED display according to the second exemplary embodiment of the invention, a timing controller 114*a* continuously monitors a FLM signal from a monitoring signal line 118 and generates a second power control signal PCS2 based on a monitoring result. On the other hand, in the OLED display according to the first exemplary embodiment of the invention, the system 20 continuously monitors the FLM signal from the monitoring signal line 18 and generates the second power control signal PCS2 based on a monitoring result. Since the OLED display according to the second exemplary embodiment of the invention is substantially the same as the OLED display according to the first exemplary embodiment of the invention except the above-described difference, a further description will be omitted in order to obviate repetition of description.

Third Exemplary Embodiment

Figure 7:
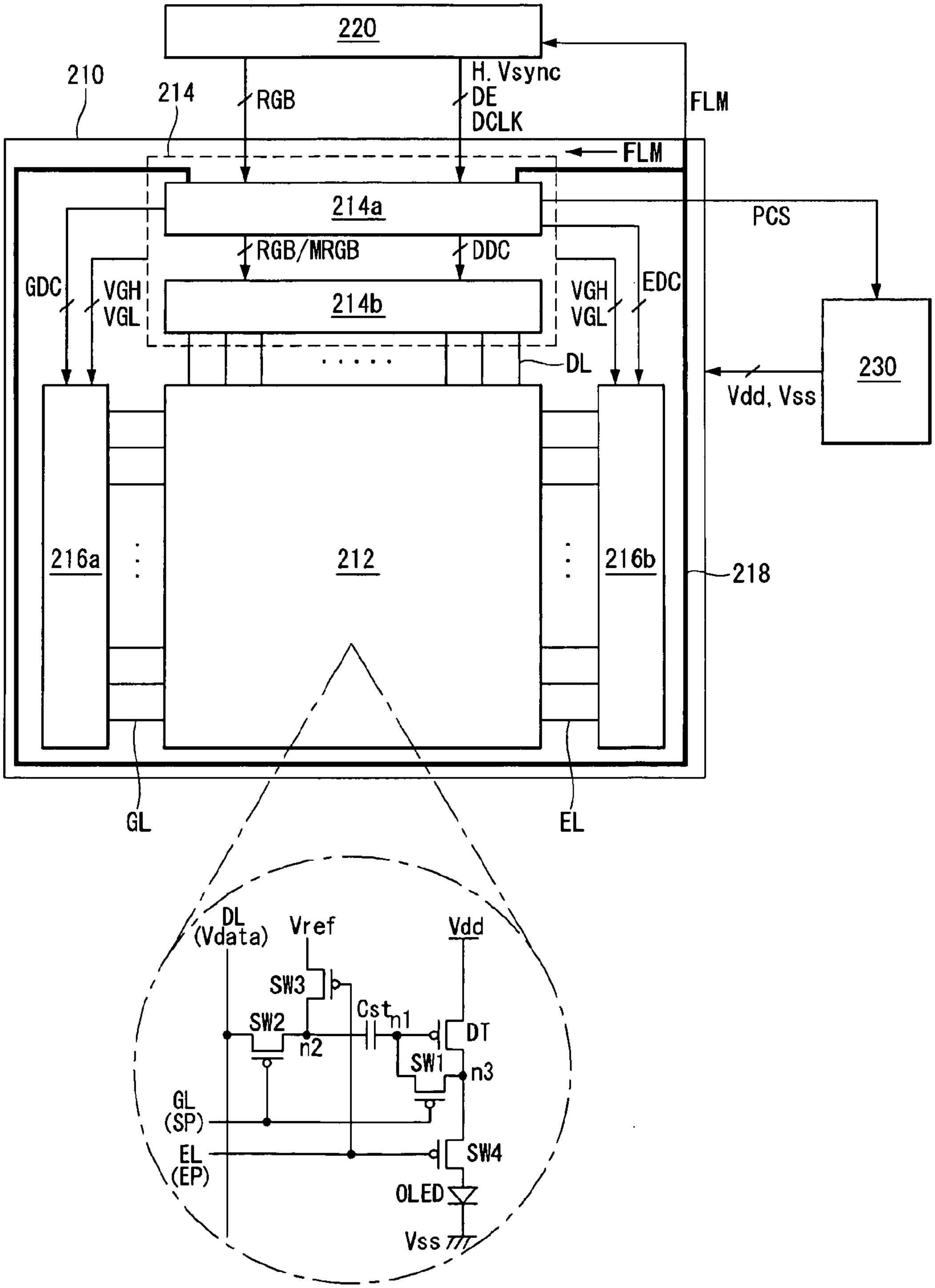
FIG. 7 is a block view of an OLED display according to a third exemplary embodiment of the invention.
Figure 8:
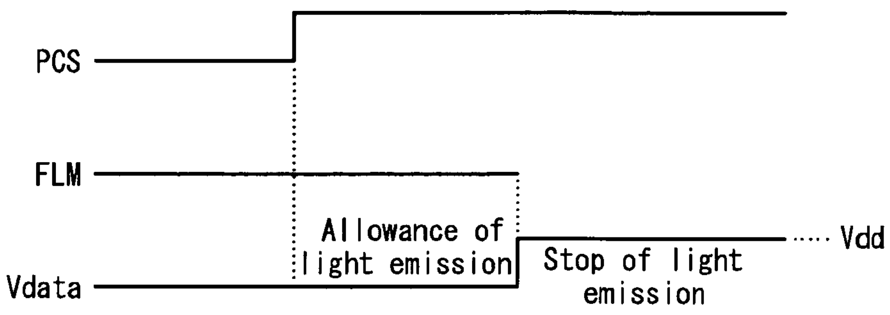
FIG. 8 is a timing diagram showing a light emission or a non-light emission of a display panel depending on a control of a data level.

FIG. 7 is a block view of an OLED display according to a third exemplary embodiment of the invention.

As shown in FIG. 7, the OLED display according to the third exemplary embodiment of the invention includes a display panel 210, a system 220, and a power IC 230. A driver IC 214 is mounted in a non-display area of the display panel 210 using a COG technology, and a scan driver 216*a* and an emission driver 216*b* are formed in the non-display area of the display panel 210 using a GIP technology. The display panel 210, the system 220, the scan driver 216*a*, and the emission driver 216*b* in the third exemplary embodiment are substantially the same as the display panel 110, the system 120, the scan driver 116*a*, and the emission driver 116*b* in the second exemplary embodiment, respectively. The power IC 230 is substantially the same as the configuration of the power IC 130 in the second exemplary embodiment except determining whether or not the power IC 230 supplies driving voltages depending on a power control signal PCS (equal to a first power control signal PCS1 in the second exemplary embodiment) in a power save mode and a normal mode irrespective of a monitoring result of a FLM signal. Accordingly, a further description will be omitted in order to obviate repetition of description.

In the third exemplary embodiment, a timing controller 214*a* controls a level of data applied to pixels 212 instead that the timing controller monitors the FLM signal and determines whether or not the power IC supplies the driving voltages based on a monitoring result.

The timing controller 214*a* continuously monitors a FLM signal from a monitoring signal line 218 formed along an outer area of the display panel 210 and determines whether or not to the digital video data RGB is to be modulated based on a monitoring result. In other words, if the FLM signal is monitored, the timing controller 214*a* supplies the digital video data RGB to a source driver 214*b* without a modulation of the digital video data RGB. If the FLM signal is not monitored, the timing controller 214*a* modulates the digital video data RGB into data MRGB capable of turning off a driving TFT DT of the pixel 212 and then supplies the data MRGB to the source driver 214*b*. A data voltage Vdata generated by the source driver 214*b* through the data MRGB has the same level as a high potential driving voltage Vdd. Even if the power IC 230 supplies the high and low potential driving voltages Vdd and Vss to the pixel 212 in a state where the display panel 210 is damaged, the driving TFT DT of the pixel 212 is turned off because of the data voltage Vdata having the same level as the high potential driving voltage Vdd. Hence, a light emission of the pixels 212 stops. Because the light emission of the pixels 212 stops, a local light emission of the display panel 210 in an abnormal state is prevented.

As described above, in the OLED display according to the embodiments of the invention, because the monitoring signal line is formed along the non-display area of the display panel and the FLM signal received through the monitoring signal line is continuously monitored, defects such as a damage of the display panel can be easily detected. Because the power IC is controlled based on the monitoring result, a supply of one of the high and low potential driving voltages to the pixels stops. Hence, a local light emission of the display panel in an abnormal state is prevented, and security problems caused by local burning are prevented.

Furthermore, in the OLED display according to the embodiments of the invention, because the driving TFT of the pixels is turned off by controlling a level of input data depending on the monitoring result, a local light emission of the display panel in an abnormal state is prevented, and security problems caused by local burning are prevented.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An organic light emitting diode (OLED) display comprising:

a display panel including pixels formed at each of crossings of a plurality of gate lines and a plurality of data lines;

a monitoring signal line formed along an outer area of the display panel on which an image is not displayed;

a first signal supply unit that supplies a monitoring signal to the monitoring signal line and generates a first power control signal;

a power supply unit that supplies a high potential driving voltage and a low potential driving voltage to the pixels in response to the first power control signal; and a second signal supply unit that monitors the monitoring signal and generates a second power control signal based on a monitoring result of the second signal supply unit that monitors, wherein if the monitoring signal is not monitored in a state where the high and low potential driving voltages are supplied to the pixels, the second signal supply unit controls the power supply unit using the second power control signal and allows the power supply unit to stop supplying one of the high and low potential driving voltages to the pixels, and wherein the first signal supply unit supplies the monitoring signal to the second signal supply unit through the monitoring signal line.

2. The OLED display of claim 1, further comprising:

a source driver driving the data lines;

a scan driver driving the gate lines;

a timing controller controlling operation timing of the source driver and operation timing of the scan driver; and a system that supplies digital video data and timing signals to the timing controller, wherein the first signal supply unit is built in the timing controller and the second signal supply unit is built in the system.

3. The OLED display of claim 1, further comprising:

a source driver driving the data lines;

a scan driver driving the gate lines;

a timing controller controlling operation timing of the source driver and operation timing of the scan driver; and a system that supplies digital video data and timing signals to the timing controller, wherein the first and the second signal supply units are built in the timing controller.

4. The OLED display of claim 2, wherein the monitoring signal is a signal requiring data of one frame to be displayed on the display panel, and wherein the monitoring signal is generated by the timing controller and then is supplied to the system through the monitoring signal line.

5. The OLED display of claim 3, wherein the monitoring signal is a signal requiring data of one frame to be displayed on the display panel, and wherein the monitoring signal is generated by the timing controller and then is supplied to the system through the monitoring signal line.

6. An organic light emitting diode (OLED) display comprising:

a display panel including pixels formed at each of crossings of a plurality of gate lines and a plurality of data lines;

a monitoring signal line formed along an outer area of the display panel on which an image is not displayed;

a signal supply unit that supplies a monitoring signal to the monitoring signal line and generates a power control signal;

a power supply unit that supplies a high potential driving voltage and a low potential driving voltage to the pixels in response to the power control signal; and a data adjusting unit that monitors the monitoring signal and adjusts a level of digital video data to be displayed on the display panel based on a monitoring result of the data adjusting unit that monitors, wherein if the monitoring signal is not monitored in a state where the high and low potential driving voltages are supplied to the pixels, the data adjusting unit adjusts the level of the digital video data at a level capable of turning off a driving thin film transistor (TFT) of each of the pixels, and wherein the signal supply unit supplies the monitoring signal to the data adjusting unit through the monitoring signal line.

7. The OLED display of claim 6, further comprising:

a source driver driving the data lines;

a scan driver driving the gate lines;

a timing controller controlling operation timing of the source driver and operation timing of the scan driver; and a system that supplies the digital video data and a timing signal to the timing controller, wherein the signal supply unit and the data adjusting unit are built in the timing controller.

8. The OLED display of claim 7, wherein the monitoring signal is a signal requiring data of one frame to be displayed on the display panel, wherein the monitoring signal is generated by the timing controller and then is supplied to the system through the monitoring signal line.

* * * * *